United States Patent
Kao et al.

(10) Patent No.: US 7,440,170 B2
(45) Date of Patent: Oct. 21, 2008

(54) METHOD AND APPARATUS FOR MONITORING OPTICAL SIGNAL-TO-NOISE RATIO

(75) Inventors: Yuan-Hua Kao, Holmdel, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/426,035

(22) Filed: Jun. 23, 2006

(65) Prior Publication Data

US 2007/0297043 A1  Dec. 27, 2007

(51) Int. Cl.
*G02B 5/13* (2006.01)
*H04B 10/08* (2006.01)

(52) U.S. Cl. .................. 359/337.2; 359/722; 398/26

(58) Field of Classification Search ............. 359/337.2, 359/722; 398/26
See application file for complete search history.

(56) References Cited

U.S. PATENT DOCUMENTS

| | | | | |
|---|---|---|---|---|
| 4,947,459 | A * | 8/1990 | Nelson et al. | 398/26 |
| 5,684,308 | A * | 11/1997 | Lovejoy et al. | 257/184 |
| 5,970,076 | A * | 10/1999 | Hamada | 372/20 |
| 6,275,623 | B1 * | 8/2001 | Brophy et al. | 385/14 |
| 6,396,051 | B1 * | 5/2002 | Li et al. | 250/227.18 |
| 6,445,838 | B1 * | 9/2002 | Caracci et al. | 385/14 |
| 6,711,188 | B2 * | 3/2004 | Ito et al. | 372/32 |
| 7,239,772 | B2 * | 7/2007 | Wang et al. | 385/17 |
| 2002/0071173 | A1 * | 6/2002 | Lee et al. | 359/337.1 |
| 2003/0202232 | A1 * | 10/2003 | Frignac et al. | 359/279 |
| 2003/0219250 | A1 * | 11/2003 | Wein et al. | 398/26 |
| 2004/0109695 | A1 * | 6/2004 | Watanabe | 398/186 |
| 2004/0114923 | A1 * | 6/2004 | Chung et al. | 398/26 |
| 2004/0156632 | A1 * | 8/2004 | Lee et al. | 398/26 |
| 2004/0223769 | A1 * | 11/2004 | Hoshida | 398/188 |
| 2005/0105902 | A1 * | 5/2005 | Alavie et al. | 398/34 |
| 2006/0007427 | A1 * | 1/2006 | Sekiya et al. | 356/73.1 |
| 2006/0067695 | A1 * | 3/2006 | Doerr et al. | 398/85 |
| 2006/0098980 | A1 * | 5/2006 | Lee et al. | 398/26 |

OTHER PUBLICATIONS

Agrawal, Govind. Fiber-Optic Communication Systems. 3rd Edition. Wiley-Interscience. May 2002. pp. 339-341.*

(Continued)

*Primary Examiner*—Eric Bolda (57) ABSTRACT

Optical signal-to-noise ratio (OSNR) monitoring methods and apparatus are described. A tunable optical filter filters an optical channel containing an optical signal and noise. The total signal and noise power at the output of the filter is measured as the transmittance passband of the filter is varied and the maximum and minimum powers are determined. The ratio between the maximum and minimum powers is then used to determine the OSNR of the optical channel, which, for example, can be a wavelength channel in a wavelength division multiplexing (WDM) system. The ratio of the maximum signal power to the minimum signal power and the ratio of the maximum noise power to the minimum noise power are pre-determined based on the signal modulation format type and filter passband characteristics. Because the OSNR monitoring method and apparatus rely on information obtained after spectrally filtering the signal and noise, their operation is independent of any transmission effect that does not affect the optical power spectra of the signal and the noise or affects them in a known manner. For example, effects such as chromatic dispersion (CD), polarization-mode dispersion (PMD), and changes in the signal degree of polarization (DOP) and noise DOP will not affect the OSNR reading thus obtained.

24 Claims, 8 Drawing Sheets

OTHER PUBLICATIONS

Humblet, Pierre. Design of Optical Matched Filters. MIT Laboratory for Information and Decision Systems. Mar. 1991.*

Cheung, Man-Hong. PMD-Insensitive OSNR Monitoring Based on Polarization-Nulling with Off-Center Narrow-Band Filtering. IEEE Photonics Technology Letters. vol. 16. No. 11. Nov. 2004.*

Liu et al. OSNR Monitoring Method for OOK and DPSK Based on Optical Delay Interferometer. IEEE Photonics Technology Letters. vol. 19. No. 15. Aug. 1, 2007.*

J. H. Lee, et al., "OSNR monitoring technique using polarization-nulling method," IEEE Photonics Technology Letters, vol. 13, Issue 1, 2001, pp. 88-90.

M. H. Cheung, et al., "PMD-insensitive OSNR monitoring based on polarization-nulling with off-center narrow-band filtering", IEEE Phot. Tech. Ltrs., vol. 16, Iss. 11, 2004.

Y. C. Ku, et al., "A novel robust OSNR monitoring technique with 40-dB dynamic range using phase modulator embedded fiber loop mirror," OFC'2006, paper OWN6.

* cited by examiner

METHOD AND APPARATUS FOR MONITORING OPTICAL SIGNAL-TO-NOISE RATIO

FIELD OF THE INVENTION

The present invention relates to the field of high-speed optical communications, and more specifically to monitoring the optical performance of optical communication networks having multiple wavelength channels.

BACKGROUND INFORMATION

The capability of monitoring the optical performance of installed optical networks is desired for maintenance and diagnostic purposes. Optical signal-to-noise ratio (OSNR) is a key optical performance indicator, and monitoring the OSNR evolution of an optical transmission link can provide vital information about its performance. In modern optical networks, such as wavelength division multiplexing (WDM) networks, channels may be individually added and dropped at any location. If the OSNR is to be monitored within each channel band and the channel bandwidth is not much broader than the signal bandwidth (as in the case of dense WDM), conventional optical spectral measurement techniques for OSNR monitoring become unreliable because it is difficult to distinguish the signal spectrum from the noise spectrum in such a channel.

Several in-band OSNR monitoring techniques have been proposed to address the aforementioned problem. One technique is based on a polarization-nulling method, as described in J. H. Lee, et al., "OSNR monitoring technique using polarization-nulling method," IEEE Photonics Technology Letters, Volume 13, Issue 1, 2001, pp. 88-90. The technique described therein assumes that the signal is fully polarized and that the noise is fully un-polarized. Unfortunately, this technique becomes unreliable in the presence of polarization-mode dispersion (PMD) and partially polarized noise, although its robustness against PMD can be improved with a special filtering technique, as explained in M. H. Cheung, et al., "PMD-insensitive OSNR monitoring based on polarization-nulling with off-center narrow-band filtering", IEEE Photonics Technology Letters, Volume 16, Issue 11, 2004, pp. 2562-2564.

To address the aforementioned shortcomings and hence enhance the robustness and accuracy of OSNR monitoring, another method based on a phase modulator embedded fiber loop mirror has been proposed which is insensitive to PMD, chromatic dispersion (CD), and the degree of polarization (DOP) of the noise, as described in Y. C. Ku, et al., "A novel robust OSNR monitoring technique with 40-dB dynamic range using phase modulator embedded fiber loop mirror," OFC'2006, paper OWN6. Disadvantageously, however, the OSNR monitoring method described therein is quite sophisticated and requires several expensive elements such as a phase modulator, a polarization scrambler, and a fiber loop mirror. Moreover, the measurement time needed to reliably measure the OSNR is long due to the need to align the polarization state of the incoming signal to a certain direction by the polarization scrambler.

SUMMARY OF THE INVENTION

The present invention is directed to novel methods and apparatus for monitoring the optical signal-to-noise ratio (OSNR) of an optical communication channel by recognizing the differences between optical signals and optical noise and how they are filtered by an optical filter. While an optical signal generally has a well-defined optical power spectrum with a distinct profile, the optical power spectrum of amplified spontaneous emission (ASE) noise typically found on a wavelength division multiplexing (WDM) communication channel, for example, is usually white or flat. In an exemplary embodiment of the present invention, a tunable optical filter having a periodic transmittance passband is used to advantageously exploit these differences. Initially, an optical signal in the absence of noise and an optical noise in the absence of a signal are filtered by the tunable optical filter. The signal and noise powers at the output of the filter are measured as the transmittance passband of the filter is varied and the maximum and minimum powers for each of the signal and noise are determined. The ratio of the maximum signal power to the minimum signal power and the ratio of the maximum noise power to the minimum noise power are determined. These ratios are then used to determine the ratio, and thus the OSNR, between the signal power and noise power of an optical signal co-propagating with noise, such as on a channel of a WDM optical communication link.

The transmittance of the tunable optical filter varies periodically with optical frequency. An optical delay interferometer (ODI) can be used as the tunable optical filter in an exemplary embodiment of the present invention.

Because the present invention relies on information obtained after spectrally filtering the signal and noise, its operation is independent of any transmission effect that does not affect the optical power spectra of the signal and the noise or affects them in a known manner. For example, effects such as chromatic dispersion (CD), polarization-mode dispersion (PMD), and changes in the signal degree of polarization (DOP) and noise DOP will not affect the OSNR reading obtained in accordance with the present invention.

The present invention may be employed with optical signals of various modulation formats, such as on-off keying (OOK) and differential phase-shift keying (DPSK) signals.

DETAILED DESCRIPTION

The following description is intended to illustrate the principles of the present invention. It will thus be appreciated that those skilled in the art will be able to devise various arrangements that, although not explicitly described or shown herein, embody the principles of the invention and are included within the spirit and scope of the invention. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, the drawings are not drawn to scale. In the description, identically numbered components within different ones of the drawings refer to the same components.

The optical signal-to-noise ratio (OSNR) of a received optical signal may be measured, in accordance with the present invention, by optically filtering a portion of the received signal with a suitable tunable filter and detecting the optical power of the filtered portion of the signal at different frequency offsets between the filter passband and the signal center frequency. As described in greater detail below, the ratio between the maximum and the minimum detected powers can then be used to derive the value of the OSNR in accordance with a predetermined relationship and parameters.

Figure 1:
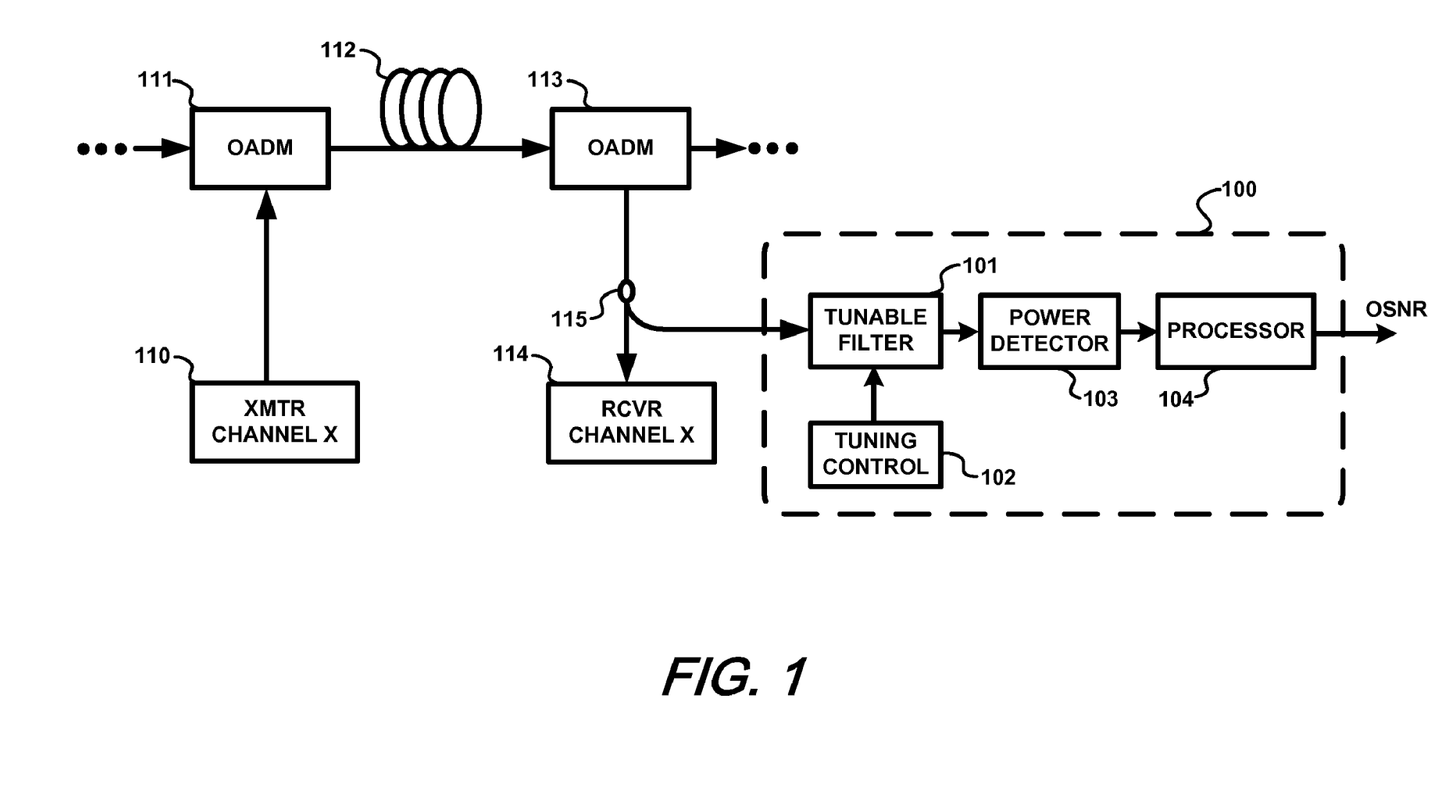
FIG. 1 is a schematic representation of an exemplary arrangement employing an OSNR monitoring apparatus in accordance with the present invention.

FIG. 1 shows an exemplary arrangement, in accordance with the present invention, for measuring the OSNR of a received signal on a channel x in a wavelength-division multiplexing (WDM) system. As shown, the WDM system comprises optical add-drop multiplexing (OADM) nodes 111 and 113 coupled by a transmission link 112. A transmitter 110 for a wavelength channel x is coupled to the OADM node 111 and a receiver 114 for the wavelength channel x is coupled to the OADM 113. An optical splitter 115 is arranged between the OADM 113 and the receiver 114 and is further coupled to an OSNR monitor 100, described in greater detail below.

An optical signal on wavelength channel x is added to the transmission system at OADM node 111. After traveling through transmission link 112, the optical signal is dropped at OADM node 113. The optical splitter 115 replicates the dropped optical signal so as to produce two copies. The optical power allocated to each of the copies from the dropped optical signal can be varied widely depending on the implementation.

In an exemplary embodiment of the present invention, the power is allocated so that approximately between 1 to 10 percent of the input power is supplied as output to the OSNR monitor 100 and the remaining power, i.e., between 90 and 99 percent, is supplied to the receiver 114.

The optical signal can be modulated in a variety of formats including, for example, amplitude shift keying (ASK), such as on-off keying (OOK), and differential phase shift keying (DPSK), such as differential binary phase-shift keying (DBPSK) and differential quadrature phase-shift keying (DQPSK).

In the exemplary embodiment shown in FIG. 1, the OSNR monitor 100 comprises an optical tunable filter 101 whose passband is periodical with a periodicity denoted as FSR, a tuning control unit 102, an optical power detector 103, and a processor 104. The passband of the optical tunable filter 101 is periodic, with a periodicity denoted as the free spectral range (FSR) of the filter. The passband of the tunable filter 101 is tuned in a periodic fashion by the tuning control unit 102 which repetitively tunes the passband of the tunable filter 101 over a range of at least 0.5 FSR (to thereby obtain at lease one maximum and one minimum transmittance). The output of the optical tunable filter 101 is supplied to the optical power detector 103, whose reaction speed is substantially slower than the bit rate of the signal. In an exemplary embodiment, the reaction speed of the optical power detector 103 is at least 100 times slower than the data rate of the signal. The optical power detector 103 may be implemented using a slow photodiode, for example. The output from the optical power detector 103 is then supplied to the processor 104 which derives the OSNR value of the received signal as described in greater detail below.

Figure 2:
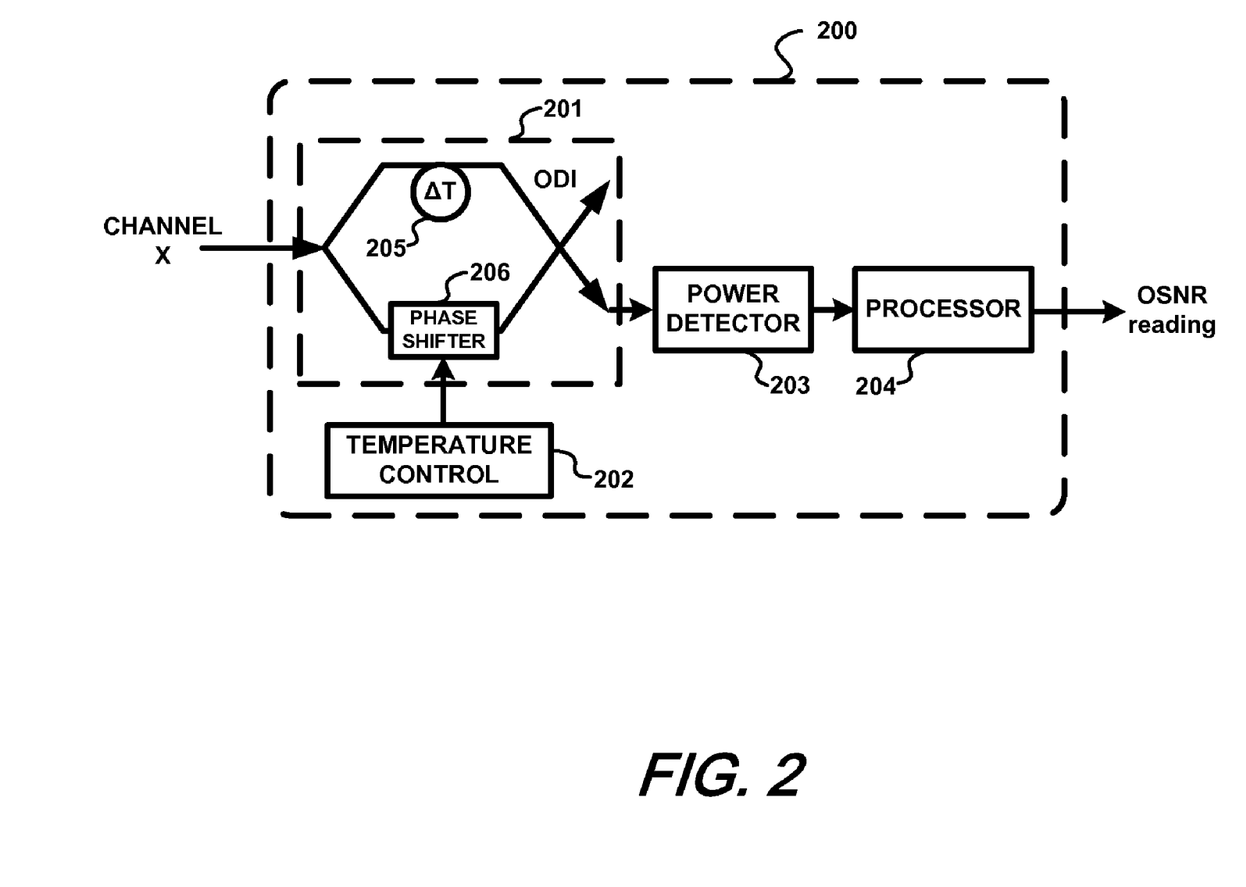
FIG. 2 is a schematic representation of an exemplary embodiment of an OSNR monitoring apparatus in accordance with the present invention.

As will be readily recognized by those of ordinary skill in the art, the optical tunable filter 101 may be an optical delay interferometer (ODI) as shown in FIG. 2. The ODI 201 has a suitable delay, $\Delta T$, in one of its two optical paths. The delay $\Delta T$ is introduced into one of the optical paths by a delay element 205. The delay $\Delta T$ is related to the FSR of the ODI as follows:

$$FSR = \frac{1}{\Delta T}. \tag{1}$$

The frequency tuning of the passband of the ODI filter 201 can be realized by changing the phase difference between the two optical paths of the ODI through a phase shifter 206 arranged in the other optical path of the ODI. The phase shifter 206 is controlled by a tuning control unit 202. The tuning control unit 202 and the phase shifter 206 can be implemented in a variety of known ways. In an exemplary embodiment, the phase shifter 206 is comprised of a thermal material so that the effective optical phase offset caused by the phase shifter is temperature-dependent. The ODI is silicon ($SiO_2$) fiber based, and the thermal material of the phase shifter is comprised of a small section of fiber (on the order of a few millimeters) that is in thermal communication with a resistive heater controlled by the tuning control unit 202. In such an implementation, the tuning control unit 202 is a temperature controller. In one implementation, with a temperature change of approximately 40° C., the phase shifter 206 can cause a phase shift of $2\pi$, or a tuning of the passband of the ODI filter by one FSR. In an exemplary embodiment of the present invention, the temperature controller causes 202 a periodic temperature change with a magnitude of 50° C. within a time period of approximately several seconds. As the ODI filter is tuned over the aforementioned range, the output of the power detector 203 is sampled by the processor 204. In the exemplary embodiment, the optical power measurement is performed with a sampling period of approximately 1% to 10% of the tuning time period, i.e., the output of the optical power detector is sampled approximately 10 to 100 times as the optical tunable filter is tuned over a tuning cycle.

As can be appreciated by one of ordinary skill in the art, the tunable filter and the tuning control unit can be implemented in a variety of ways, including implementations with mechanical tuning, for example.

Figure 3:
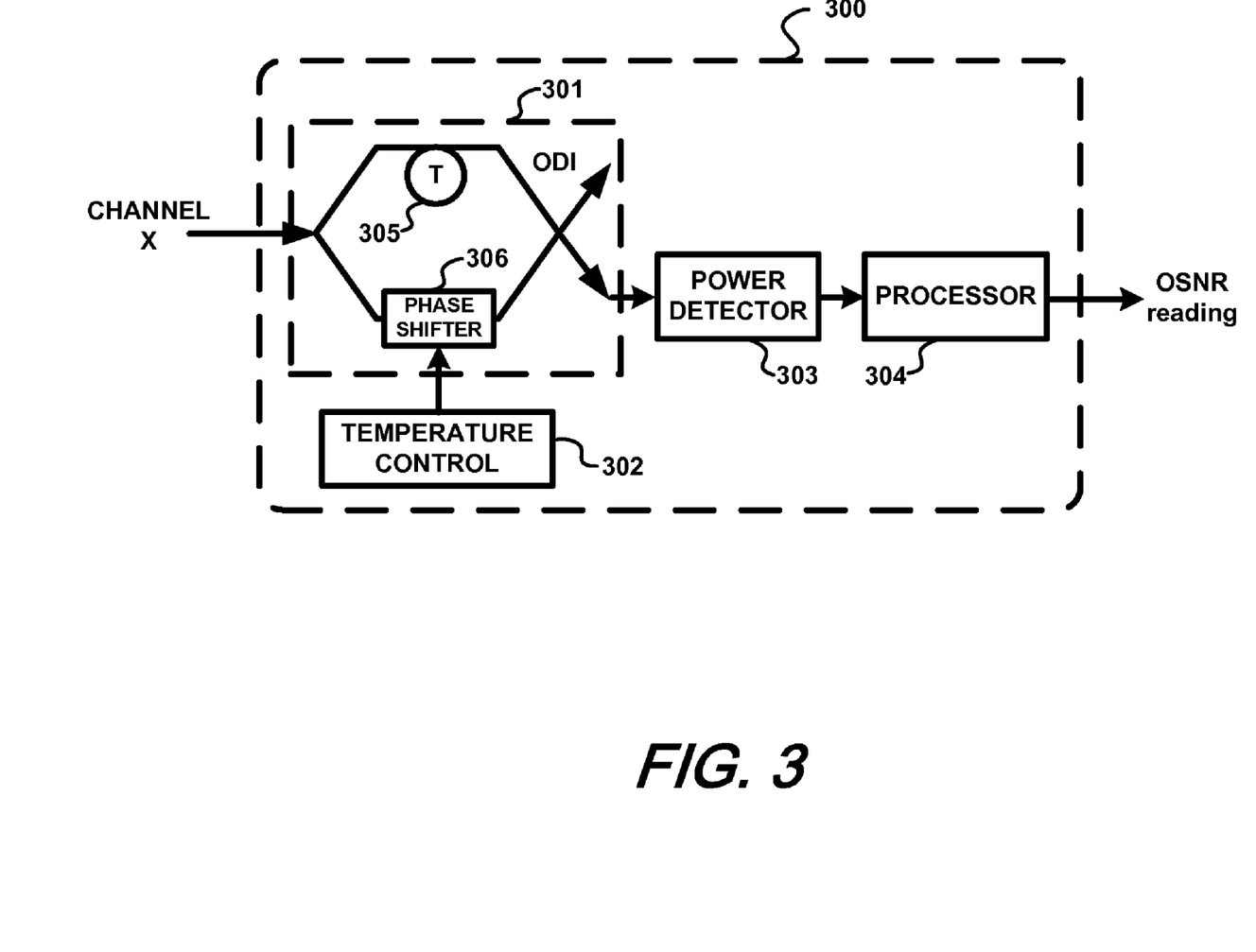
FIG. 3 is a schematic representation of a further exemplary embodiment of an OSNR monitoring apparatus for OOK signals in accordance with the present invention.

In an exemplary embodiment of the present invention, illustrated in FIG. 3, the ODI filter 301 includes a delay element 305 which introduces a delay of approximately one signal bit period T in one of the ODI's optical paths. The frequency tuning of the passband of the ODI filter 301 can be realized by changing the phase difference between the two optical paths of the ODI filter 301 using phase shifter 306. The phase shifter 306 is controlled by tuning control unit 302, which can be, for example, a temperature controller, as discussed above.

Figure 4:
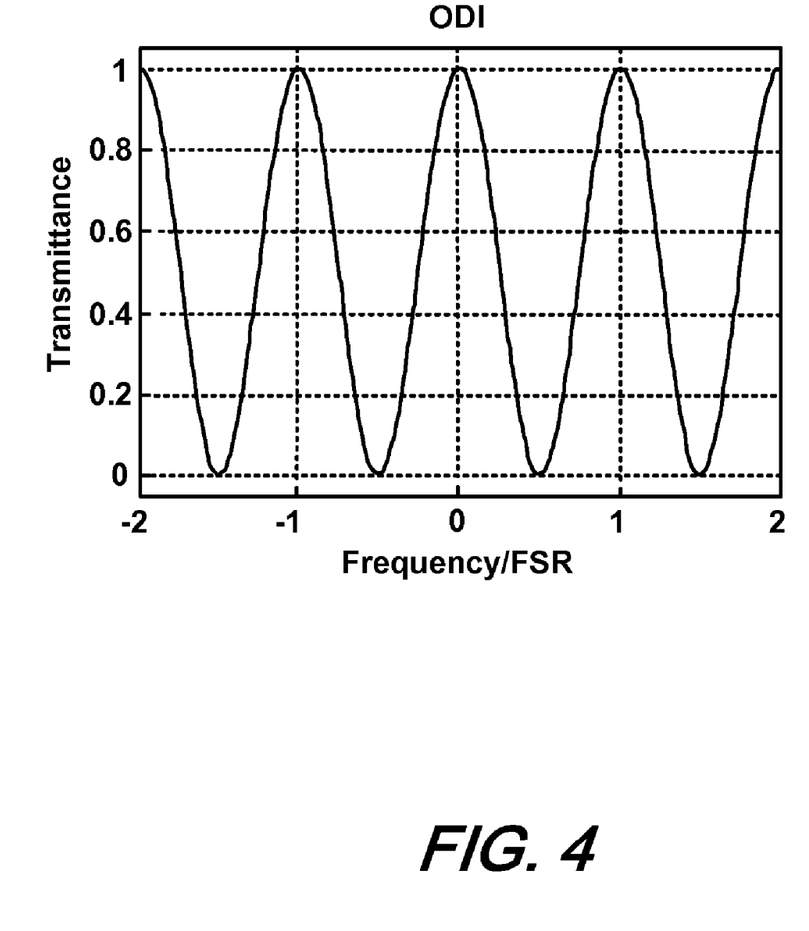
FIG. 4 is a graph of the transmittance of a typical optical delay-interferometer (ODI) filter as a function of the ratio of the frequency to the free spectral range (FSR) of the ODI filter.

The transmittance of a typical ODI filter is shown in FIG. 4 as a function of the ratio of the tuning frequency to the filter FSR. As discussed above, the filter exhibits a periodic transmittance.

In another embodiment of the present invention where the signal to be monitored has discrete spectral components (or tones) associated with the signal bit rate (BR), the ODI filter has a delay that is a fraction of one signal bit period. Amplitude-shift keying (ASK) signals (including OOK signals, for example) usually have discrete spectral tones associated with the signal bit rate. In other words, for a bit rate BR, the FSR of the ODI filter satisfies the following relationship:

$$FSR = \frac{BR}{n}, \text{ where } n = (1, 2, 3, \ldots). \quad (2)$$

When the above condition is satisfied, the output from the ODI filter is maximized when the passband peaks of the filter align with the major spectral tones of the signal, and the difference between the maximum output power and minimum output power from the filter is enhanced so that the OSNR monitoring method becomes more accurate, as discussed further below.

As will be readily recognized by those of ordinary skill in the art, ODIs 201 and 301 may be any type of interferometer having appropriate characteristics. For example, ODIs 201 and 301 may be based on the well-known Mach-Zehnder or Michelson interferometers.

Figure 5:
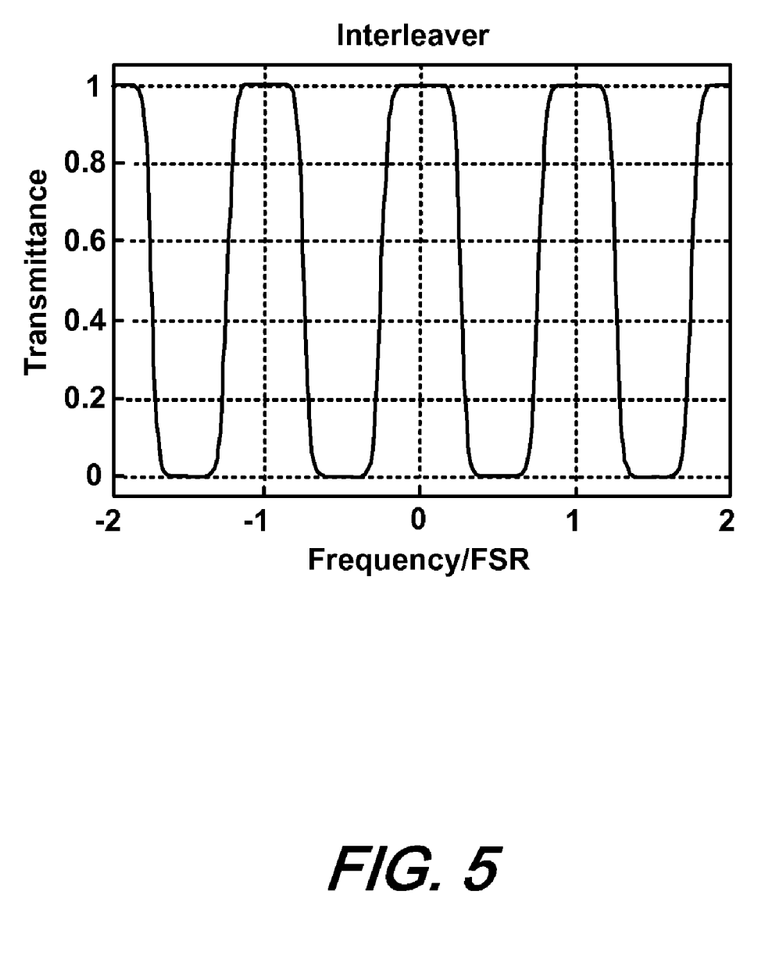
FIG. 5 is a graph of the transmittance of a typical interleaver filter as a function of the ratio of the frequency to the FSR of the filter.

In an exemplary embodiment, the optical tunable filter 101 may be an optical interleaver filter having a periodic transmittance profile. The transmittance of a typical interleaver filter is shown in FIG. 5.

An exemplary process using the arrangement of FIG. 1 will now be described for deriving the OSNR value of the received optical signal by processing the detected output power from the optical tunable filter 101 in accordance with the principles of the present invention. The ratio between the maximum and minimum signal powers (without noise) that are output from the filter while the filter is tuned within a given frequency range (that is approximately one FSR of the filter), is defined as follows:

$$s = \frac{\max(P_{s\_out})}{\min(P_{s\_out})}. \quad (3)$$

The ratio between the maximum and minimum noise powers (without signal) that are output from the filter while the filter is tuned over the aforementioned frequency range is defined as follows:

$$n = \frac{\max(P_{n\_out})}{\min(P_{n\_out})}. \quad (4)$$

The ratios s and n are generally different due to the characteristics of the filter and the power spectra of the signal and noise.

Assuming that the signal power and noise power are maximized at the same filter tuning frequency (which is usually true if the signal spectrum is centered within the spectral range of the dropped channel), the maximum and minimum overall powers (i.e., the powers of the combined signal and noise) output from the filter measured while the filter is tuned within the given frequency range can be expressed as follows:

$$P_{\max} = \frac{n}{n+1}P_n + \frac{s}{s+1}P_s \quad (5)$$
$$P_{\min} = \frac{1}{n+1}P_n + \frac{1}{s+1}P_s.$$

Denoting the ratio $P_{max}/P_{min}$ as R, or $$R = \frac{P_{\max}}{P_{\min}}, \quad (6)$$

then the ratio between the signal power and the noise power of the dropped channel is $$\frac{P_s}{P_n} = \left[\frac{(n+1)(s-n)}{(R-n)(s+1)} - \frac{n+1}{s+1}\right]^{-1}. \quad (7)$$

Using the conventional definition of OSNR in units of dB and with a 12.5 GHz noise bandwidth yields the following:

$$OSNR_{dB} = 10\log10\left(\frac{P_s}{P_n} \cdot \frac{NEB}{12.5 \text{ GHz}}\right), \quad (8)$$

where NEB is the noise equivalent bandwidth of the dropped channel. The NEB is determined by the effective bandwidth of the wavelength dropping filter, typically found in the OADM node 113, for example.

Figure 6:
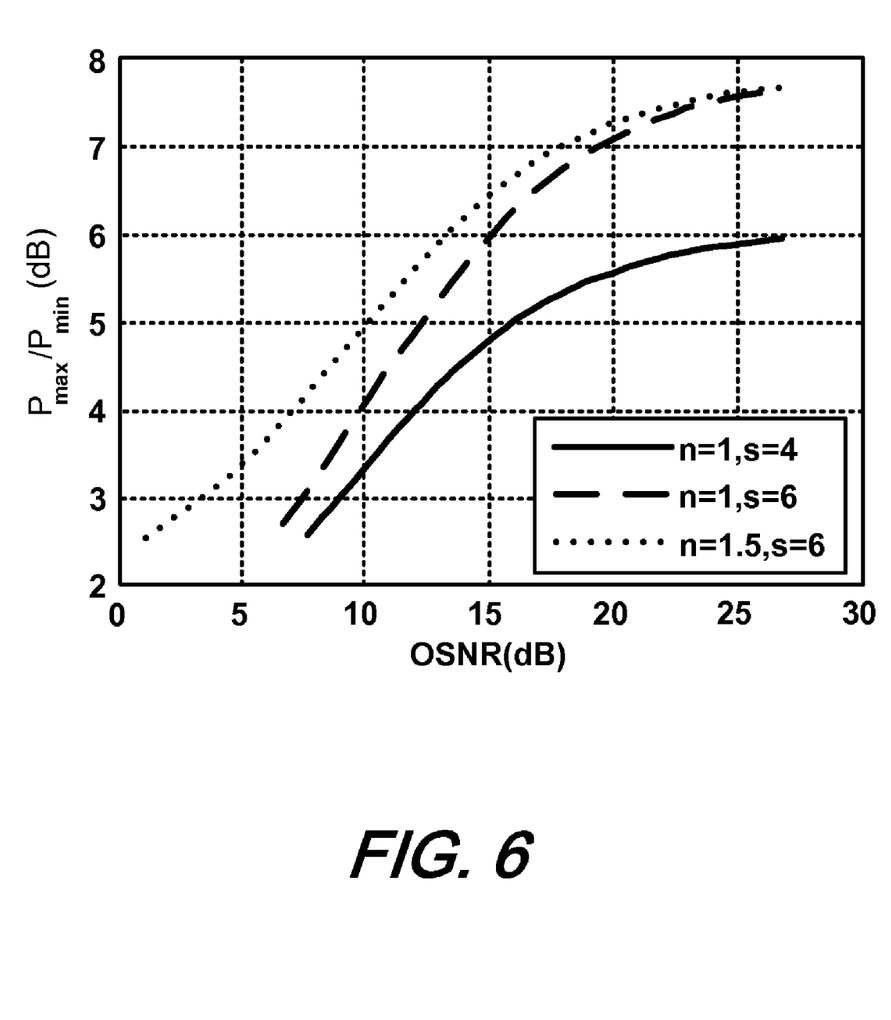
FIG. 6 shows the calculated power ratio R (or $P_{max}/P_{min}$) of a dropped channel signal with noise as a function of OSNR for three different cases: (n=1, s=4), (n=1, s=6), and (n=1.5, s=6), where $n=Pn_{max}/Pn_{min}$ and $s=Ps_{max}/PS_{min}$.

FIG. 6 shows the calculated power ratio R as a function of OSNR for three cases: 1) n=1, s=4; 2) n=1, s=6; and 3) n=1.5, s=6. The noise equivalent bandwidth (NEB) of the channel is assumed to be 80 GHz. The value of the OSNR can be determined once the power ratio R is measured and parameters s, n, and NEB are known. The larger the ratio s between the maximum and minimum signal output powers from the filter is, the more accurate the ONSR monitoring method becomes for a given measurement error in measuring R.

In an exemplary embodiment of an OSNR monitor illustrated in FIG. 3, the signal under evaluation is of on-off-keying (OOK) modulation format, and the tunable filter 301 is a 1-bit ODI. Commonly, the carrier of an optical signal is coherent over at least a few bit periods. For a typical OOK signal, the optical power after a 1-bit ODI, integrated over many bits, reaches maximum (or minimum) upon full constructive (or destructive) interference in the ODI. In the case of an infinite extinction ratio (ER) and equal probabilities of 1's and 0's, the maximum and minimum powers are:

$$P_{max} = \frac{1}{2}P_N + \frac{3}{4}P_s, \quad P_{min} = \frac{1}{2}P_N + \frac{1}{4}P_s, \qquad (9)$$

where $P_N$ and $P_S$ are the powers of the in-band noise and the signal, respectively. Taking into consideration a finite effective ER, due to practical optical modulation, the following expressions result:

$$P_{max} = \frac{1}{2}P_N + \frac{3}{4}P_s + \frac{1}{2}P_s\sqrt{\frac{1}{ER} - \frac{1}{ER^2}}, \qquad (10)$$

$$P_{min} = \frac{1}{2}P_N + \frac{1}{4}P_s - \frac{1}{2}P_s\sqrt{\frac{1}{ER} - \frac{1}{ER^2}}.$$

Comparing the above expressions with Eq. 5, s can be expressed as a function of ER as follows:

$$s = \frac{3 + 2\sqrt{\frac{1}{ER} - \frac{1}{ER^2}}}{1 - 2\sqrt{\frac{1}{ER} - \frac{1}{ER^2}}}, \qquad (11)$$

and n=1, which indicates that the maximum noise output is essentially equal to the minimum noise output, as a result of assuming that the noise is white and the NEB is much larger than the FSR of the filter.

Figure 7:
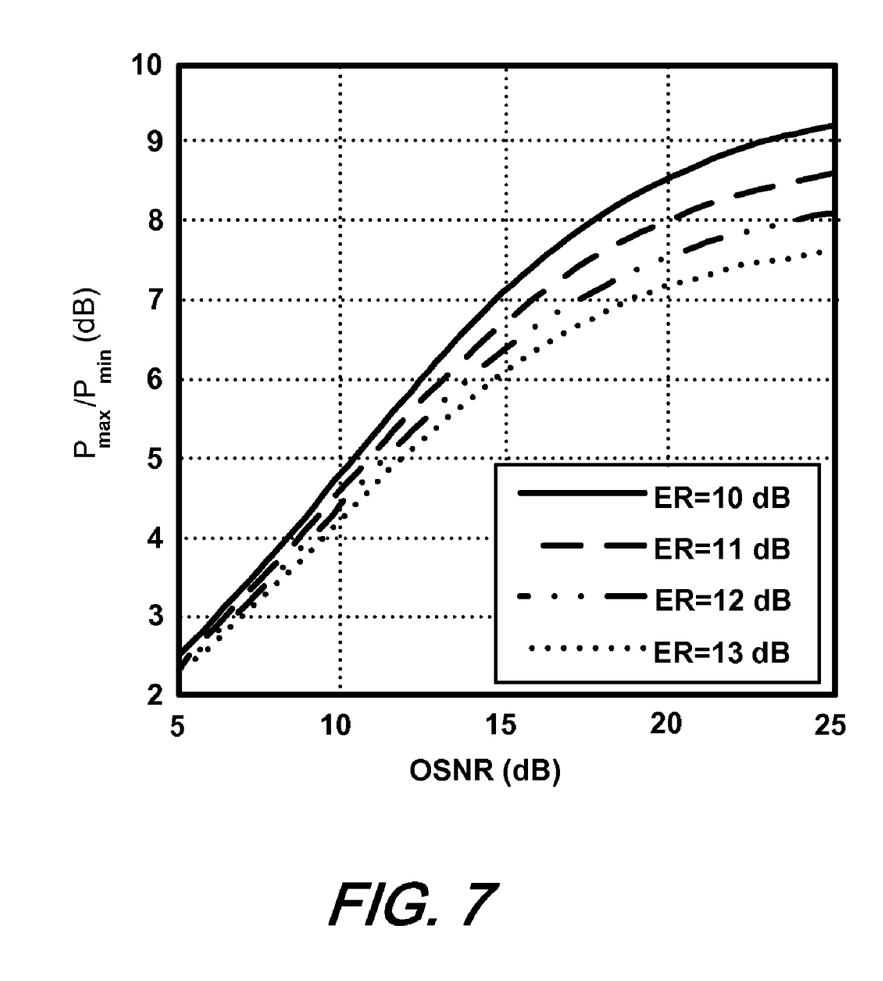
FIG. 7 shows the calculated power ratio R (or $P_{max}/P_{min}$) of a dropped channel signal with noise as a function of OSNR for OOK signals with different extinction ratios (ERs).

Thus, the OSNR of the signal, following the conventional definition with a 0.1-nm noise bandwidth, can then be expressed as follows:

$$OSNR_{dB} = 10 \cdot \log_{10}\left\{\frac{NEB}{0.1\,nm}\left[\frac{1 + 2\sqrt{\frac{1}{ER} - \frac{1}{ER^2}}}{R - 1} - \frac{1 - 2\sqrt{\frac{1}{ER} - \frac{1}{ER^2}}}{2}\right]^{-1}\right\}, \qquad (12)$$

where $R=P_{max}/P_{min}$ is as defined in Eq. 6. FIG. 7 shows the power ratio R as a function of the OSNR at different ERs. OSNR can be measured with reasonable accuracy in the range between 0 and 25 dB. At higher OSNRs (e.g., $\geq$25 dB), the ratio R changes more gradually with the OSNR, and the measurement error is expected to be larger.

The exemplary OSNR monitoring method of the present invention has been verified experimentally. A 10-Gb/s non-return-to-zero (NRZ) OOK signal was generated by a commercial transmitter, which inputted a $2^{31}$-1 PRBS sequence from a pulse pattern generator. The effective ER of the signal was 11.3 dB. The NEB, determined by the OADM dropping filter, is approximately 0.64 nm.

A 1-bit ODI based on a planar lightwave circuit design commonly used for DPSK demodulation was used in the experimental arrangement. The ODI included a phase shifter capable of causing a phase shift of π with a temperature change of about 4° C. A temperature controller was employed to periodically change the temperature of the phase shifter, through a resistive heater, by 5° C. in a time period of approximately 10 seconds. The sampling period for the optical power measurement at the output of the optical power detector was approximately 50 ms. After obtaining each power ratio R, the OSNR value was calculated using Eq. 12.

Figure 8:
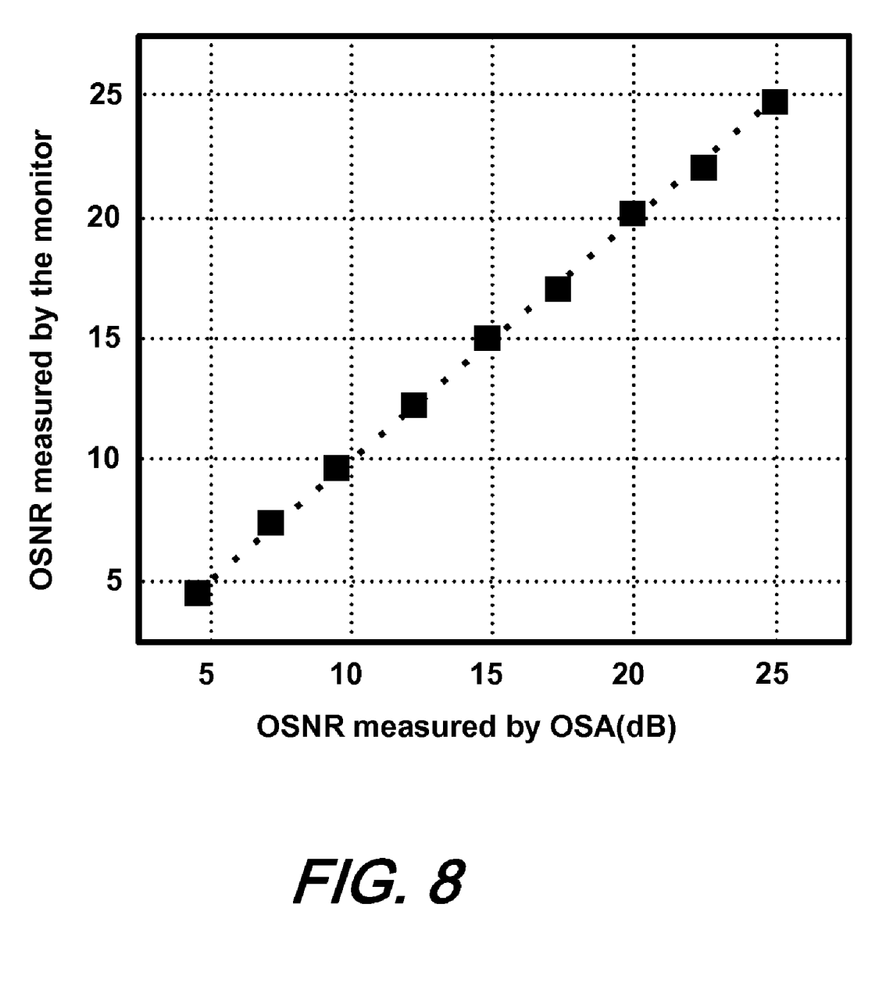
FIG. 8 shows OSNR as measured using an exemplary method of the present invention as a function of OSNR as measured with an optical spectrum analyzer.

The OSNR was varied by degrading the signal with various amounts of ASE noise. An optical spectrum analyzer (OSA) was used to measure reference OSNR values against which the OSNR values obtained with the monitoring method of the present invention could be compared. FIG. 8 shows the OSNR, as determined by the monitoring method of the present invention, as a function of the reference OSNR, as measured by the OSA. The monitoring error is approximately 0.25 dB in the OSNR range of 5 to 25 dB. Similarly accurate OSNR measurements are obtained when the mean power into the power detector is as low as −40 dBm, demonstrating the high sensitivity of the OSNR monitoring technique of the present invention. The OSNR monitoring results were also found to be independent of CD, PMD, and the DOP of the noise.

In an exemplary embodiment of the present invention for use with DPSK signals, the optical tunable filter has an FSR that satisfies the following relationship:

$$FSR > 1.5 \cdot SR, \qquad (13)$$

where SR is the symbol rate of the DPSK signal.

In a further exemplary embodiment of the present invention, the signal under evaluation is of differential binary phase-shift keying (DBPSK) modulation format, and the tunable filter is a 0.5-bit ODI (i.e., its delay element introduces a delay of 0.5 T).

In yet a further exemplary embodiment for use with DPSK signals, the FSR of the optical tunable filter satisfies the following relationship:

$$FSR < 1.5 \cdot NEB, \qquad (14)$$

where NEB is the noise equivalent bandwidth of the optical communication channel.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An optical signal-to-noise ratio (OSNR) monitoring apparatus comprising:
    an optical tunable filter having a periodic transmittance passband for filtering an optical communication channel carrying a signal and a noise, the transmittance passband having a minimum transmittance and a maximum transmittance, wherein the optical tunable filter is an optical delay interferometer;
    a tuning control unit for tuning the transmittance passband of the optical tunable filter between the maximum and minimum transmittances;
    an optical power detector for measuring a power of the filtered optical communication channel; and
    a processing unit for determining the OSNR of the optical communication channel based on maximum and minimum powers measured by the optical power detector, wherein the power is measured at least 10 times as the tuning control unit tunes the transmittance passband of the optical tunable filter between the maximum and minimum transmittances.

2. The apparatus of claim 1, wherein the transmittance passband of the optical tunable filter is periodically tuned by the tuning control unit over a range of at least a free spectral range (FSR) of the filter.

3. The apparatus of claim 1, wherein the optical delay interferometer includes a Michelson interferometer.

4. The apparatus of claim 1, wherein the optical tunable filter is an optical interleaver.

5. The apparatus of claim 1, wherein the signal is an on-off-keying (OOK) modulated signal.

6. The apparatus of claim 5, wherein the optical tunable filter has a free spectral range (FSR) that satisfies the following relationship:

$$FSR = \frac{BR}{n},$$

where n=1, 2, 3, . . . and BR is a bit rate of the signal.

7. The apparatus of claim 1, wherein the signal is a differential phase-shift keying (DPSK) modulated signal.

8. The apparatus of claim 7, wherein the optical tunable filter has a free spectral range (FSR) that satisfies the following relationship:

$$FSR > 1.5 \cdot SR,$$

where SR is a symbol rate of the DPSK signal.

9. The apparatus of claim 7, wherein the FSR of the optical tunable filter satisfies the following relationship:

$$FSR < 1.5 \cdot NEB,$$

where NEB is a noise equivalent bandwidth of the optical communication channel.

10. The apparatus of claim 1, wherein the power detector has a reaction speed which is at least 100 times smaller than a data rate of the signal.

11. The apparatus of claim 1, wherein the transmittance passband of the optical tunable filter is thermally tuned by the tuning control unit.

12. The apparatus of claim 1, wherein the transmittance passband of the optical tunable filter is mechanically tuned by the tuning control unit.

13. The apparatus of claim 1, wherein the optical communication channel is a wavelength division multiplexing (WDM) channel.

14. A method for monitoring the optical signal-to-noise ratio (OSNR) of an optical communication channel comprising:

filtering an optical communication channel carrying a signal and a noise, the filtering being performed with an optical tunable filter with a periodic transmittance passband having a minimum transmittance and a maximum transmittance, wherein the optical tunable filter is an optical delay interferometer;

tuning the transmittance passband of the optical tunable filter between the maximum and minimum transmittances;

measuring a power of the filtered optical communication channel, wherein the power is measured at least 10 times as the transmittance passband of the optical tunable filter is tuned between the maximum and minimum transmittances; and determining the OSNR of the optical communication channel based on maximum and minimum powers measured on the filtered optical communication channel.

15. The method of claim 14, wherein the signal is an on-off-keying (OOK) modulated signal.

16. The method of claim 15, wherein the filtering is characterized by a free spectral range (FSR) that satisfies the following relationship:

$$FSR = \frac{BR}{n},$$

where n=1, 2, 3, . . . and BR is a bit rate of the signal.

17. The method of claim 14, wherein the signal is a differential phase-shift keying (DPSK) modulated signal.

18. The method of claim 17, wherein the filtering is characterized by a free spectral range (FSR) that satisfies the following relationship:

$$FSR > 1.5 \cdot SR,$$

where SR is a symbol rate of the DPSK signal.

19. The method of claim 17, wherein the filtering is characterized by a free spectral range (FSR) that satisfies the following relationship:

$$FSR < 1.5 \cdot NEB,$$

where NEB is a noise equivalent bandwidth of the optical communication channel.

20. The method of claim 14, wherein measuring the power of the filtered optical communication channel is characterized by a speed which is at least 100 times smaller than a data rate of the signal.

21. The method of claim 14, wherein the optical communication channel is a wavelength division multiplexing (WDM) channel.

22. The method of claim 14, wherein the transmittance passband of the filter is periodically tuned over a range of at least a free spectral range (FSR) of the filter.

23. The method of claim 14, wherein the transmittance passband of the filter is thermally tuned.

24. The method of claim 14, wherein the transmittance passband of the filtering is mechanically tuned.

* * * * *